(12) United States Patent
Chen et al.

(10) Patent No.: US 10,143,992 B2
(45) Date of Patent: Dec. 4, 2018

(54) LIGHT IRRADIATION MULTI-SAMPLE PARALLEL REACTION DEVICE

(71) Applicant: BEIJING PERFECTLIGHT SCIENCE AND TECHNOLOGY LTD, Beijing (CN)

(72) Inventors: Lei Chen, Beijing (CN); Qiulin Li, Beijing (CN)

(73) Assignee: BEIJING PERFECTLIGHT SCIENCE AND TECHNOLOGY LTD, Beijing (CN)

(*) Notice: Subject to any disclaimer, the term of this patent is extended or adjusted under 35 U.S.C. 154(b) by 127 days.

(21) Appl. No.: 15/328,869

(22) PCT Filed: Jul. 27, 2015

(86) PCT No.: PCT/CN2015/085240
§ 371 (c)(1),
(2) Date: Jan. 24, 2017

(87) PCT Pub. No.: WO2016/011986
PCT Pub. Date: Jan. 28, 2016

(65) Prior Publication Data
US 2017/0203272 A1    Jul. 20, 2017

(30) Foreign Application Priority Data

Jul. 25, 2014 (CN) .......................... 2014 1 0361142

(51) Int. Cl.
*B01J 19/12* (2006.01)
*B01J 19/28* (2006.01)
*B01J 19/00* (2006.01)

(52) U.S. Cl.
CPC .............. *B01J 19/12* (2013.01); *B01J 19/004* (2013.01); *B01J 19/123* (2013.01); *B01J 19/127* (2013.01);
(Continued)

(58) Field of Classification Search
None
See application file for complete search history.

(56) References Cited

FOREIGN PATENT DOCUMENTS

| CN | 201203607 Y | 3/2009 |
|----|-------------|--------|
| CN | 101947426 A | 1/2011 |

(Continued)

OTHER PUBLICATIONS

International Serach Report from PCT/CN2015/085240, dated Nov. 2, 2015.

*Primary Examiner* — Kishor Mayekar
(74) *Attorney, Agent, or Firm* — Morgan, Lewis & Bockius LLP

(57) ABSTRACT

A light irradiation multi-sample parallel reaction device comprises: a base (1), a support disc (2) horizontally fixed and mounted above the base (1), a top disc (3) mounted above the support disc (2), a rotating disc (4) rotatably mounted below the support disc (2), and a plurality of reaction flasks (5), wherein a plurality of light transmission holes are circumferentially formed in the support disc (2); the plurality of reaction flasks (5) are placed on the light transmission holes in a one-to-one correspondence; a plurality of reaction flask through-holes for the reaction flasks (5) to pass through are formed in the top disc (3); a plurality of sets of stirrers (7) corresponding to the reaction flasks (5) are mounted between the top disc (3) and the support disc (2), and used for stirring liquids in the reaction flasks (5); the rotating disc (4) is arranged coaxially with the support disc (2); and a plurality of light sources (9) are arranged on an upper surface of the rotating disc (4). The device enables the irradiation intensity of light entering solutions to be consistent, improving experimental accuracy.

12 Claims, 3 Drawing Sheets

(52) U.S. Cl.
CPC .............. *B01J 19/128* (2013.01); *B01J 19/28* (2013.01); *B01J 2219/0801* (2013.01); *B01J 2219/12* (2013.01)

(56) References Cited

FOREIGN PATENT DOCUMENTS

| CN | 202290030 U | 7/2012 |
| CN | 203216914 U | 9/2013 |
| CN | 104190344 A | 12/2014 |

# LIGHT IRRADIATION MULTI-SAMPLE PARALLEL REACTION DEVICE

TECHNICAL FIELD

The present invention relates to the fields of photocatalysis and photochemical reactions, and particularly, to a light irradiation multi-sample parallel reaction device.

BACKGROUND

With continuing in-depth study in the fields of photocatalysis and photochemical reactions, it is especially important to evaluate properties of different reactants and catalysts under the equal light irradiation condition during experimental research. Particularly in the field of photocatalysis, due to long time periods of photocatalysis experiments, which may range from several hours to several days, if catalysts are directly used in experiments, it will take considerably long time and great effort with a need of inputting many other resources, such as light sources, measuring instruments, consumables, and the like. It will take several weeks and even several months to finish parallel comparative experiments for catalytic effects of several sets of samples.

Generally, existing light irradiation parallel reaction devices are of a lateral irradiation type. That is, an irradiation light source is disposed in the center of reaction test tubes arranged annularly, and emits light that is incident into reaction solutions from one side through the walls of reaction flasks or the test tubes. Such a device has the following defects and shortcomings:

(1) It is difficult to ensure consistency in the degree of finish and roundness of the walls of the reaction flasks or the test tubes during machining, causing poor consistency of irradiation intensity into solutions during a parallel comparative experiment; as a result, the accuracy of the results of the comparative experiment will be affected.

(2) For lateral incidence, the light use ratio is extremely low; on one hand, the cylindrical surfaces of the test tubes have high reflectivity to light, leading to a low incidence rate; on the other hand, light at gaps between the test tubes cannot be used. Experimental results are strengthened by increasing the power of the light source in the prior art, resulting in waste of resources.

(3) When the reaction device operates in an experiment, the test tubes rotate around the light source, which increases the difficulty of online sampling detection; therefore, full-automatic operation cannot be achieved.

(4) The flexibility is poor. Without a light intensity adjustment system, light filters need to be changed when different experimental wavelengths are chosen; and this will cause a great decrease in luminous flux.

SUMMARY

(I) Technical Problem to be Solved

The present invention aims at providing a light irradiation multi-sample parallel reaction device having the advantages of good consistency of irradiation intensity into solutions during experiments and improved accuracy of experimental results.

(II) Technical Scheme

In order to solve the above technical problem, the present invention provides a light irradiation multi-sample parallel reaction device, comprising: a base, a support disc horizontally fixed and mounted above the base, a top disc mounted above the support disc, a rotating disc rotatably mounted below the support disc, and a plurality of reaction flasks. A plurality of light transmission holes are formed in the support disc. The plurality of reaction flasks are placed on the light transmission holes in a one-to-one correspondence. A plurality of reaction flask through-holes are formed in the top disc to allow the reaction flasks to pass through to be placed on the support disc. A plurality of sets of stirrers are mounted between the top disc and the support disc, and used for stirring liquids in the reaction flasks. The rotating disc is arranged coaxially with the support disc, and a plurality of light sources are arranged on an upper surface of the rotating disc.

The stirrers are magnetic stirrers, and each magnetic stirrer comprises a magnetic shield rotatably mounted on a lower surface of the top disc and hollowly sleeving the respective reaction flask, a magnetic stir bar placed in the respective reaction flask, a power magnet fixed to the magnetic shield, and a driving mechanism connected to the magnetic shield and used for driving the magnetic shield to rotate.

The driving mechanism comprises a stirring motor, and a synchronous pulley fixedly connected to the respective magnetic shield, and the stirring motor drives the synchronous pulley to rotate by means of a synchronous belt.

The power magnet comprises two permanent magnets oppositely mounted on the magnetic shield, or an electromagnetic winding disposed on the magnetic shield.

The light sources are one or more selected from an LED lamp, a xenon lamp, a mercury lamp, and a halogen lamp.

The bottoms of the reaction flasks are formed by optical polishing, and the necks of the reaction flasks are provided with sealing threads.

The light sources are connected to an external power source by means of a conducting slip ring.

The rotating disc is mounted on the base by means of a rotating shaft, and the conducting slip ring is mounted on the rotating shaft.

The rotating shaft is driven by a rotating motor through a pulley assembly.

This reaction device further comprises a controller used for controlling luminance of the light sources, rotating of the rotating disc, and operation of the stirrers.

The plurality of light transmission holes are disposed in a circumferential direction of the support disc, and the plurality of light sources are circumferentially disposed on the upper surface of the rotating disc, and correspond to the light transmission holes.

The plurality of light sources are arranged into an array or annularly arranged into a plurality of rows in a direction away from a center on the upper surface of the rotating disc.

(III) Beneficial Effects

The light irradiation multi-sample parallel reaction device provided by the present invention has the following advantages:

(1) Light is incident into the reaction flasks from the bottoms thereof with good consistency of irradiation intensity into the solutions in the parallel comparative experiment and improved accuracy of the experimental results.

(2) Planar light transmission slices are optically polished and ground to allow good light transmission; also, the planar light transmission slices have reduced reflectivity, and high incidence rate; thus, resources can be saved.

(3) A plurality of light sources circularly irradiate the reaction solutions; therefore, the influence of inconsistency of the irradiation intensity of a single light emitting source on the comparative results of the photochemical reactions is eliminated.

(4) The positions of the reaction flasks are relatively fixed, thereby facilitating the implementation of automatic experiments.

(5) Good flexibility is achieved. Since the controller is disposed to control the luminance of the light sources, the work of replacing the light sources is reduced, and the experimental efficiency is improved.

Figure 1:
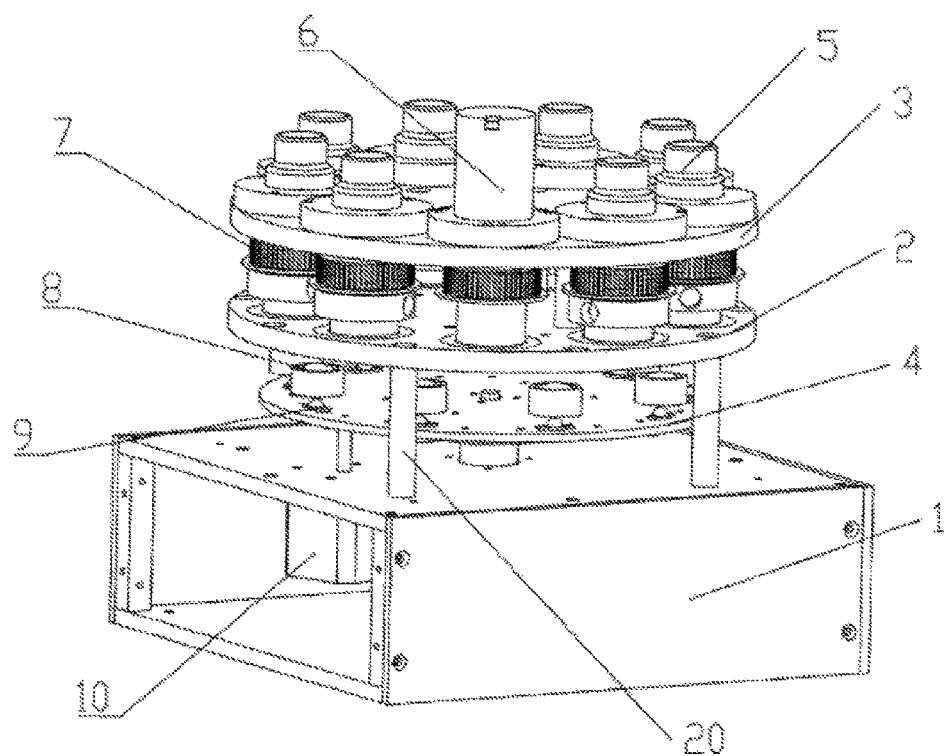
FIG. 1 is a three-dimentional diagram of embodiment 1 of the present invention.

In the figures, the reference numerals denote: 1: base, 2: support disc, 3: top disc, 4: rotating disc, 5: reaction flask, 6: stirring motor, 7: magnetic stirrer, 8: collecting lens, 9: light source, 10: rotating motor, 11: magnetic stir bar, 12: magnetic shield, 13: synchronous pulley, 14: power magnet, 15: rotating shaft, 16: lead, 17: conducting slip ring, 18: controller, 19: pulley assembly, 20: support frame, and 21: support pillar.

DETAILED DESCRIPTION

The specific implementations of the present invention will be described in further detail below in combination with the accompanying drawings and embodiments. The following examples are intended to illustrate the present invention rather than limiting the scope of the present invention.

Embodiment 1

Figure 2:
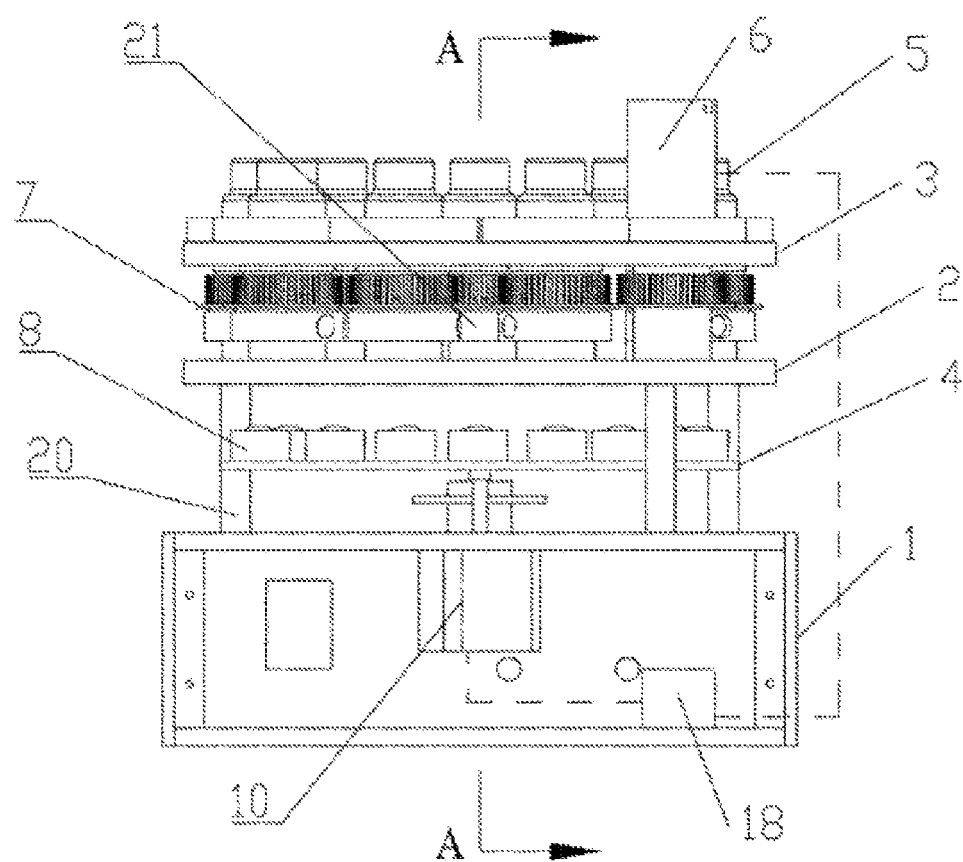
FIG. 2 is a front view of embodiment 1 of the present invention.
Figure 3:
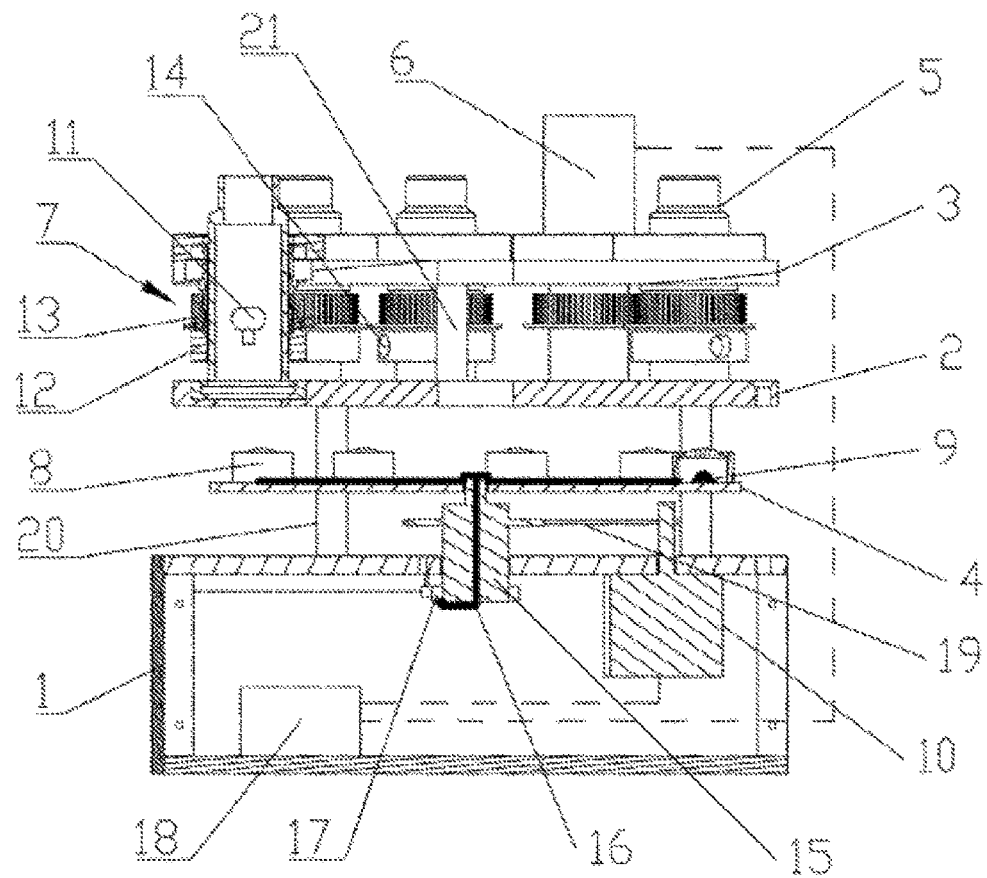
FIG. 3 is a sectional view taken along a direction A-A in FIG. 2.

Referring to FIG. 1 to FIG. 3, a light irradiation multi-sample parallel reaction device comprises: a base 1, a support disc 2, a top disc 3, a rotating disc 4, and a plurality of reaction flasks 5. The number of the reaction flasks 5 is 8 in this embodiment, and the following description will be made with eight reaction flasks 5. The base 1 is a rectangular hollow frame formed by steel plates. The rotating disc 4, the support disc 2 and the top disc 3 are all circular. The support disc 2 is horizontally fixed and mounted above the base 1 by means of support frames 20. The top disc 3 is detachably mounted above the support disc 2 by means of a support pillar 21 and parallel to the support disc 2. The rotating disc 4 is rotatably mounted below the support disc 2, parallel to the support disc 2 as well, and arranged coaxially with the support disc. Eight light transmission holes are formed in the circumferential direction of the support disc 2, and lenses, or nothing, may be mounted in the light transmission holes. Preferably, an annular groove for placing the reaction flask is formed around each light transmission hole. The body of each of the reaction flasks 5 used in the present invention is made of glass, and the bottom of each of the reaction flasks 5 is a planar light transmission slice. Specifically, the bottom of each of the reaction flasks 5 is made of quartz; after being subjected to strict optical grinding and polishing, the planar light transmission slice is integrated with the flask body made of glass through a special optical machining process such that the reaction flask is resistant to corrosion of chemical reagents, such as strong acids, strong bases, and the like. The neck of each of the reaction flasks 5 is provided with sealing threads, and each of the reaction flasks 5 can be covered with a cap with threads, thereby ensuing airtightness in the experimental process. Preferably, the section of each of the reaction flask 5 is circular or rectangular. The eight reaction flasks 5 are placed on the eight light transmission holes in a one-to-one correspondence. Eight reaction flask through-holes are formed in the top disc 3 to allow the reaction flasks 5 to pass through to be placed on the support disc 2. Eight sets of stirrers corresponding to the reaction flasks 5 are mounted between the top disc 3 and the support disc 2, and used for stirring liquids in the reaction flasks 5. In this embodiment, the eight sets of stirrers are all magnetic stirrers 7 that are mounted on the lower surface of the top disc 3 and turned over around the reaction flasks 5, and each of the eight sets of magnetic stirrers 7 corresponds to one reaction flask 5. Eight light sources 9 corresponding to the light transmission holes are circumferentially disposed in the upper surface of the rotating disc 4 and connected to an external power source by means of a conducting slip ring 17. In order to make light emitted from the light sources 9 be better incident into the reaction flasks 5, each of the light sources 9 is covered with a collecting lens 8 such that the light emitted from the light sources 9 enters the reaction flasks 5 from the bottoms thereof after being collected by the collecting lenses 8. The light sources 9 are preferably one or more selected from a high power LED (light emitting diode) lamp, a xenon lamp, a mercury lamp, and a halogen lamp. That is, the plurality of light sources 9 may be one or a combination of various different light sources; for example, the plurality of light sources 9 may all LED light sources, or may be a combination of xenon lamps and halogen lamps.

In this embodiment, a rotating shaft 15 is fixed to the central lower surface of the rotating disc 4, and the lower end of the rotating shaft 15 penetrates through the upper plate of the base 1 into the base 1, and is rotatably mounted on the base 1. The conducting slip ring 17 is mounted on the rotating shaft 15, and forms relatively slipping electrical connection with the external power source. The rotating shaft 15 is a hollow shaft; a lead 16 of each light source 9 passes through the hollow portion of the rotating shaft, and is connected to the conducting slip ring 17, thereby allowing the light source 9 to obtain electric energy. The rotating shaft 15 is connected to a rotating motor 10 mounted in the base 1 by means of a pulley assembly 19, and driven by the rotating motor 10 to rotate horizontally. The rotating motor 10 drives, by means of the pulley assembly 19 (other slow-down drive mechanisms may also be possible), the light sources 9 in annular distribution to rotate at a certain speed, such that each of the reaction flasks 5 is exposed to irradiation of all the light sources 9; therefore, the influence of inconsistency of the irradiation intensity of a single light emitting source on the comparative results of photochemical reactions is eliminated. In this embodiment, the number and positions of the light sources 9 are both the same as the number and positions of the light transmission holes; when the requirement on data is not high, the rotating disc may also not be rotated. It needs to be noted that the number of the light sources 9 can be selected according to the requirements of tests, and may not be necessarily identical to the number of the light transmission holes.

In this embodiment, each of the sets of magnetic stirrers 7 comprises a magnetic shield 12, a magnetic stir bar 11, a power magnet 14, and a driving mechanism. The magnetic shield 12 is a cylinder with both ends open, and has an inner diameter greater than the maximum outer diameter of the respective reaction flask 5 (when the reaction flask 5 is rectangular, the maximum outer diameter thereof is the outer diameter at the diagonal positions). One end of the magnetic shield 12 is rotatably mounted on the lower surface of the top disc 3 by means of a bearing or a shaft sleeve, and hollowly sleeves the respective reaction flask 5. The magnetic stir bar 11 is placed in the respective reaction flask 5. In this embodiment, the power magnet 14 comprises two permanent magnets; two fixing holes are oppositely formed in the magnetic shield 12, and the two permanent magnets are fixed in the fixing holes of the magnetic shield 12. The driving mechanism is connected to the magnetic shield 12, and used for driving the magnetic shield 12 to rotate. The driving mechanism comprises a stirring motor 6 and a synchronous pulley 13 fixedly connected to the magnetic shield 12, wherein the stirring motor 6 drives the synchronous pulley 13 to rotate by means of a synchronous belt (not shown in the figures), and there can be multiple or one stirring motor 6. When there are multiple stirring motors 6, each stirring motor 6 drives one synchronous pulley 13 to rotate, resulting in complex structure of this reaction device; moreover, it is hard to keep the speeds of multiple stirring motors 6 completely consistent, and thus being unable to ensure consistent rotating speed. In this embodiment, preferably, only one stirring motor 6 is used, which is mounted on the upper surface of the top disc 3; the shaft of the motor penetrates through the top disc 3 with a distance between the axis of the shaft of the motor and the center of the top disc 3 equal to a distance between the axis of each reaction flask through-hole and the center of the top disc 3. The stirring motor 6 is connected to the synchronous pulley 13 of each of the sets of magnetic stirrers by means of a synchronous belt. When rotating, the magnetic shield 12 drives the power magnet 14 to rotate; when the magnetic shield 12 rotates, under the action of the magnetic force, the magnetic stir bar suspending in the respective reaction flask 5 is driven to rotate, thereby stirring a liquid in the reaction flask 5.

Further, the present invention also comprises a controller 18 used for controlling luminance of the light sources 9, rotating of the rotating disc 4, and operation of the stirrers. The controller 18 is chosen from a programmable controller, a single chip, or a speed governor. The rotating motor 10 and the stirring motors 6 of the present invention both are servomotors. The controller 18 is mounted within the hollow base 1, electrically connected to the rotating motor 10 and the stirring motors 6, and used for controlling the rotating speeds and rotating directions of the rotating motor 10 and the stirring motors 6, thus controlling operation of the stirrers and the rotating disc. The controller 18 is further in communication connection with the light sources 9 to regulate the luminance of the light sources.

Embodiment 2

This embodiment is substantially the same as embodiment 1, and differs from embodiment 1 in that the magnetic stirrers in this embodiment are mounted on the support disc, and located outside the reaction flasks.

Embodiment 3

This embodiment is substantially the same as embodiment 1, and differs from embodiment 1 in that each power magnet in this embodiment is an electromagnetic winding, which is disposed on the respective magnetic shield 12 and located on the outer wall or the inner wall thereof to form an annular electromagnet ring for driving the respective magnetic stir bar 11.

Embodiment 4

This embodiment is substantially the same as embodiment 1, and differs from embodiment 1 in that each power magnet is located below the rotating disc 4, and two permanent magnets or electromagnets are arranged on a plane to drive the respective magnetic stir bar in the respective reaction flask.

Embodiment 5

This embodiment is substantially the same as embodiment 1, and differs from embodiment 1 in that in this embodiment, the arrangement of the plurality of light transmission holes on the support disc may be circumferential arrangement, array arrangement, or other arrangements. Accordingly, the plurality of light sources are arranged into an array or annularly arranged into a plurality of rows in a direction away from the center on the upper surface of the rotating disc. The light sources arranged into an array or annularly arranged allow more uniform incident light and thus realize irradiation with equivalent light amount.

It needs to be explained that the plurality of light sources of the present invention should be interpreted broadly; and in the case of using a single light producing element to produce light and leading out the same by a plurality of light guide elements, it should also be considered as a plurality of light sources.

Use of the reaction device of the present invention (1) The bottoms of the reaction flasks 5 are cleaned by using lens paper, and if there exists internal residue, it needs to be removed by using a corresponding reagent; thus, the light transmission of the planar light transmission slices is ensured.

(2) Prepared reaction solutions and mediums are put into the reaction flasks 5, and the magnetic stir bars 11 are placed into the flasks. Then, it needs to be viewed whether each magnetic stir bar 11 is horizontally and transversely placed at the bottom of each flask; otherwise, the reaction flask is shaken such that the magnetic stir bar 11 is transversely placed.

(3) The reaction flasks 5 are passed through the reaction flask through-holes from up to down and inserted into the magnetic shields 12. While inserting, it needs to be viewed whether each magnetic stir bar 11 is suspended in the solution under the action of the magnetic force; otherwise, the magnetic stir bar 11 should be inserted again. Under the attractive action of the magnetic force of each power magnet 14, each magnetic stir bar 11 is subjected to the magnetic force generated by the power magnet 14 on the magnetic shield 12, and the magnetic stir bar and the power magnet are kept in one horizontal plane. When each reaction flask 5 is continuously inserted downwards, the respective magnetic stir bar 11 stays immobile, and is suspended in the reaction flask 5.

(4) A power switch is closed, and the knobs of the stirring motors 6 are adjusted to stabilize the stirring speed at an appropriate speed, thereby ensuring no splashing of the solutions. When the stirring motors drive the magnetic shields 12 to rotate, the magnetic stir bars 11 in the flasks rotate along with the power magnets 14, thus achieving the stirring effect.

(5) The luminance of the light sources 9 is adjusted, and the light intensity of the light source 9 is set to appropriate luminance. Moreover, the speed of the rotating motor 10 is adjusted as required.

The present invention has the following advantages:

(1) Light is incident into the reaction flasks from the bottoms thereof with good consistency of irradiation intensity into the solutions in the parallel comparative experiment and improved accuracy of the experimental results.

(2) The planar light transmission slices are optically polished and ground to allow good light transmission; also, the planar light transmission slices have reduced reflectivity, and high incidence rate; thus, resources can be saved.

(3) The plurality of light sources circularly irradiate the reaction solutions; therefore, the influence of inconsistency of the irradiation intensity of a single light emitting source on the comparative results of the photochemical reactions is eliminated.

(4) The positions of the reaction flasks are relatively fixed, thereby facilitating the implementation of automatic experiments.

(5) Good flexibility is achieved. Since the controller is disposed to control the luminance of the light sources, the work of replacing the light sources is reduced, and the experimental efficiency is improved.

The foregoing descriptions are merely preferred embodiments of the present invention, instead of limiting the present invention. Any modification, equivalent substitution, improvement, and the like made within the spirit and principle of the present invention should all fall into the protection scope of the prevent invention.

INDUSTRIAL APPLICABILITY

The present invention provides a light irradiation multi-sample parallel reaction device, comprising: a base, a support disc horizontally fixed and mounted above the base, a top disc mounted above the support disc, a rotating disc rotatably mounted below the support disc, and a plurality of reaction flasks. A plurality of light transmission holes are formed in the support disc. The plurality of reaction flasks are placed on the light transmission holes in a one-to-one correspondence. A plurality of reaction flask through-holes are formed in the top disc to allow the reaction flasks to pass through to be placed on the support disc. A plurality of sets of stirrers are mounted between the top disc and the support disc, and used for stirring liquids in the reaction flasks. The rotating disc is arranged coaxially with the support disc, and a plurality of light sources are arranged on an upper surface of the rotating disc. According to the present invention, the light is incident into the reaction flasks from the bottoms thereof with good consistency of irradiation intensity into the solutions in a parallel comparative experiment and improved accuracy of experimental results; and a plurality of light sources circularly irradiate the reaction solutions; therefore, the influence of inconsistency of the irradiation intensity of a single light emitting source on the comparative results of photochemical reactions is eliminated. In short, the present invention has excellent applicability.

The invention claimed is:

1. A light irradiation multi-sample parallel reaction device, comprising: a base, a support disc horizontally fixed and mounted above the base, a top disc mounted above the support disc, a rotating disc rotatably mounted below the support disc, and a plurality of reaction flasks, wherein a plurality of light transmission holes are formed in the support disc; the plurality of reaction flasks are placed on the light transmission holes in a one-to-one correspondence; a plurality of reaction flask through-holes are formed in the top disc to allow the reaction flasks to pass through to be placed on the support disc; a plurality of sets of stirrers are mounted between the top disc and the support disc, and used for stirring liquids in the reaction flasks; the rotating disc is arranged coaxially with the support disc; and a plurality of light sources are arranged on an upper surface of the rotating disc.

2. The light irradiation multi-sample parallel reaction device of claim 1, wherein the stirrers are magnetic stirrers, and each magnetic stirrer comprises a magnetic shield rotatably mounted on a lower surface of the top disc and hollowly sleeving the respective reaction flask, a magnetic stir bar placed in the respective reaction flask, a power magnet fixed to the magnetic shield, and a driving mechanism connected to the magnetic shield and used for driving the magnetic shield to rotate.

3. The light irradiation multi-sample parallel reaction device of claim 2, wherein the driving mechanism comprises a stirring motor, and a synchronous pulley fixedly connected to the respective magnetic shield, and the stirring motor drives the synchronous pulley to rotate by means of a synchronous belt.

4. The light irradiation multi-sample parallel reaction device of claim 2, wherein the power magnet comprises two permanent magnets oppositely mounted on the magnetic shield, or an electromagnetic winding disposed on the magnetic shield.

5. The light irradiation multi-sample parallel reaction device of claim 1, wherein the light sources are one or more selected from an LED lamp, a xenon lamp, a mercury lamp, and a halogen lamp.

6. The light irradiation multi-sample parallel reaction device of claim 1, wherein bottoms of the reaction flasks are formed by optical polishing, and necks of the reaction flasks are provided with sealing threads.

7. The light irradiation multi-sample parallel reaction device of claim 1, wherein the light sources are connected to an external power source by means of a conducting slip ring.

8. The light irradiation multi-sample parallel reaction device of claim 1, wherein the rotating disc is mounted on the base by means of a rotating shaft, and the conducting slip ring is mounted on the rotating shaft.

9. The light irradiation multi-sample parallel reaction device of claim 8, wherein the rotating shaft is driven by a rotating motor through a pulley assembly.

10. The light irradiation multi-sample parallel reaction device of claim 1, further comprising a controller used for controlling luminance of the light sources, rotating of the rotating disc, and operation of the stirrers.

11. The light irradiation multi-sample parallel reaction device of claim 1, wherein the plurality of light transmission holes are disposed in a circumferential direction of the support disc, and the plurality of light sources are circumferentially disposed on the upper surface of the rotating disc, and correspond to the light transmission holes.

12. The light irradiation multi-sample parallel reaction device of claim 1, wherein the plurality of light sources are arranged into an array or annularly arranged into a plurality of rows in a direction away from a center on the upper surface of the rotating disc.

* * * * *